350-377 SR

[redacted] XR [redacted] 3,609,723

7X4030W

United State

[11] 3,609,723

[72] Inventors John K. Alstad;
James R. Wiitala, both of Boulder, Colo.
[21] Appl. No. 887,905
[22] Filed Dec. 24, 1969
[45] Patented Sept. 28, 1971
[73] Assignee International Business Machines Corporation
Armonk, N.Y.

[54] PIEZOREFLECTIVE-MAGNETOSTRICTIVE FILM TRANSDUCER
10 Claims, 2 Drawing Figs.

[52] U.S. Cl. 340/174.1 M, 179/100.2 CH, 350/151
[51] Int. Cl. G11b 11/10, G02f 1/22
[50] Field of Search 340/174.1 M; 179/100.2 CH; 350/149, 151

[56] References Cited
UNITED STATES PATENTS

| | | | |
|---|---|---|---|
| 3,183,359 | 5/1965 | White | 350/149 |
| 3,474,431 | 10/1969 | Griffiths | 340/174.1 M |
| 3,513,457 | 5/1970 | Nelson | 179/100.2 CH |

OTHER REFERENCES

Magneto-Optical Readout Device, Alstad et al., IBM Technical Disclosure Bulletin, Vol. 9, No. 12, May 1967, pg. 1763

*Primary Examiner*—Bernard Konick
*Assistant Examiner*—Robert S. Tupper
*Attorney*—Reilly and Lewis

ABSTRACT: Magnetic information is converted to optical signals by placing a coupled piezoreflective-magnetostrictive film layer between the information-containing medium and a light source; and the pattern of magnetization on the medium induces a similar pattern of elongation or contraction in the magnetostrictive film which imparts a strain at corresponding locations in the piezoreflective film and a resulting change in reflectivity of the film. Accordingly, the reflectance of light incident upon the piezoreflective film surface can be sensed to determine the presence or absence of magnetization at particular locations on the information-containing medium.

3609723
OR IN 360/114

PATENTED SEP 28 1971

3,609,723

INVENTORS
JOHN K. ALSTAD
JAMES R. WIITALA
BY
ATTORNEYS

PIEZOREFLECTIVE-MAGNETOSTRICTIVE FILM TRANSDUCER

This invention relates to a novel and improved magnetic reproduction system, and more particularly relates to a novel and improved film transducer for sensing the state of magnetization on a magnetically recorded medium, such as, bits of information recorded on a magnetic tape, and for converting same to optical signals.

In the retrieval of information recorded on a suitable medium, such as, for instance, magnetic tapes or disks, it is highly desirable to be able to read the magnetically recorded information without direct physical contact with the medium in order to minimize wear both of the playback head and tape normally associated with conventional playback systems. A number of magneto-optical systems have been devised wherein a linearly polarized beam of light is directed onto a magnetic transfer film which is in close alignment with the recorded medium. The transfer film is responsive to changing patterns of magnetization on the medium so that the major direction of polarization of the light beam is displaced or rotated by the polarity of the magnetic field. Typically, an analyzer is employed to intercept the reflected light and to sense fluctuations of intensity of the light resulting from displacement or rotation of the major direction of polarization and which changes can be transduced into a corresponding change in current or voltage by a photodetector. The rotation of the major direction of polarization of the reflected light beam from a magnetized surface, commonly referred to as the Kerr magneto-optical effect, necessitates polarization of the light source, resolution of the light by special optical systems, such as, a transparent prismatic element and an analyzer. An analyzer is customarily required to measure displacement of the emergent light from each position on the film.

It is, therefore, proposed to simplify magneto-optical transducer systems of the type described and to provide an improved system through the utilization of a transfer film which will obviate the use of a polarizer or analyzer, avoid depth-of-field problems and the requirement for prisms or other special optics. Moreover, increased accuracy and sensitivity is attained with a film transducer having a Figure of Merit substantially higher than that obtained from conventional magneto-optic systems.

Accordingly, it is an object of the present invention to provide a novel and improved method and means for transducing magnetically recorded information to optical signals which is accurate and highly sensitive to changing patterns of the states of magnetization with an optimal signal-to-noise ratio in the detection and conversion to optical signals.

It is another object of the present invention to provide a film transducer for conversion of the magnetic field on a recorded medium to optical signals which is simplified, inexpensive and eliminates elements and special optics normally associated with conventional magneto-optical transducer systems.

It is a further object of the present invention to provide a magnetic transfer film transducer which accurately senses changing patterns of magnetization on a recorded medium without direct contact with the medium together with accurate conversion of the changing patterns or states of magnetization to optical signals by direct incidence of light upon the film transducer thereby resulting in an increased Figure of Merit and a higher signal-to-noise ratio.

The magnetic transfer film transducer of the present invention converts magnetically recorded information on a recorded medium into optical signals through the utilization of a coupled piezoreflective-magnetostrictive film layer disposed in close alignment with the recorded medium. The magnetic filed, or pattern of magnetization, on the recorded medium acts upon the magnetostrictive film to induce localized contraction or elongation at particular points on the film corresponding to the pattern of magnetization on the recorded medium. In turn, elongation of the magnetostrictive film will impart a strain to corresponding locations on the piezoreflective film whereby to modify the reflectivity of the film surface at those points and consequently the reflectance of incident light. Reflectance of the light is sensed by a suitable photodetector system, such as, a bank of photodiodes, to complete the conversion of the magnetically recorded information to optical signals.

In the preferred form, the composition of the piezoreflective-magnetostrictive film layers is such that it is capable of accurately sensing the rapidly changing, magnetic bits of information on a moving magnetic tape medium whereby to indice a corresponding pattern of changing strain in the piezoreflective film which undergoes resultant changes in reflectivity. The piezoreflective film is composed of silver having a thickness on the order of 100 to 10,000 angstroms and is coated by evaporation onto the surface of a flat or curved transparent substrate. Next, the magnetostrictive film, preferably composed of 60 percent nickel, 25 percent iron, and 15 percent cobalt, by weight, is coated onto the piezoreflective film by evaporation with a resultant thickness also on the order of 100 to 10,000 angstroms. The evaporation takes place in the presence of an orienting magnetic field. The two film layers may be supported by a flat or curved transparent substrate in close alignment with the magnetically recorded medium, the magnetostrictive film being disposed on the side adjacent to the recorded medium.

The foregoing and other objects, features and advantages of the invention will be apparent from the following more particular description of preferred embodiments of the invention, as illustrated in the accompanying drawing.

Figure 1:
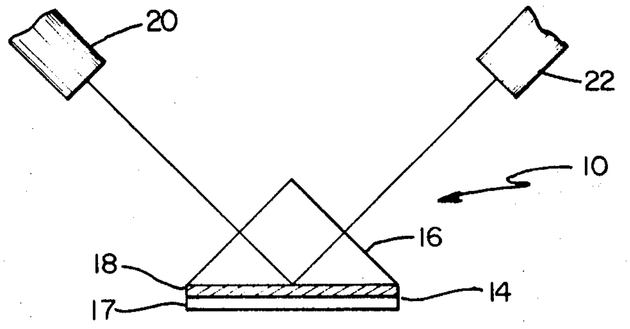
FIG. 1 is a schematic diagram illustrating one preferred form of film transducer.

Referring in detail to the drawing, there is shown in FIG. 1 a magneto-optical system 10 which is especially adaptable for detection of large area magnetic fields or magnetically recorded bits of information on a tape or disk. In the system, a coupled piezoreflective magnetostrictive film layer 14 is supported by a prism 16 so as to be responsive to the magnetic field from tape or disk or from an object or area to be tested or measured, such as, a magnetic pole piece, cyclotron, and the like.

In a manner to be hereinafter described in more detail, the film layer 14 has a magnetostrictive film 17 which is elongated or contracted according to the state of magnetization on the medium and which in turn imposes a strain and resultant reduction in reflectivity on the piezoreflective film 18. A light source 20 is disposed at a 45° incident angle to the film layer 14 to direct light through one side of the prism onto the piezoreflective surface, and the emergent light reflected from the surface through the opposite side of the prism is intercepted by a photodetector 22. The light source 20 may be suitable defined by a monochromaic source, and the photodetector 22 may be comprised of a bank of photodiodes or photomultiplier tube and a lens system to image the reflected light onto the photodiodes or photomultiplier tube.

In the form shown in FIG. 1, the magnetostrictive film layer 17 may be composed of a nickel-iron or nickel-aluminum alloy on the order of 100 to 10,000 angstroms in thickness. In turn, the piezoreflective layer 18 may be composed of silver, gold, copper, or another metal which will undergo strain in response to elongation or contraction of the magnetostrictive layer, and similarly can be on the order of 100 to 10,000 angstroms thick. For example, a highly sensitive film layer may be prepared by evaporation from a 60 percent nickel, 25 percent iron, and 15 percent cobalt melt (weight percent). Variations in the melt composition of ±5 percent is permissible without materially effecting the magnetoelastic properties of the films. A piezoreflective film 18 composed of silver is suitably coupled to the magnetostrictive film by coating the film by evaporation onto one surface of the magnetostrictive film.

Generally, since the film layer is extremely thin, it must be supported in close alignment with the magnetic field by a transparent substrate, such as, a flat or curved glass slide. In the form shown in FIG. 1, where the incident light is at 45° to the surface of piezoreflective layer, a transparent prismatic material is utilized both for supporting the film layers and reflecting the light in the proper direction toward the photodetector system.

In the alternate form of invention shown in FIG. 2, the film layer 14' is composed of the same materials described with reference to the film layer 14 of FIG. 1, being composed of a magnetostrictive film layer 17' and piezoreflective layer 18' again coated by evaporation onto the undersurface of a glass slide 24 so as to be supported in close alignment to a recorded medium M.

Figure 2:
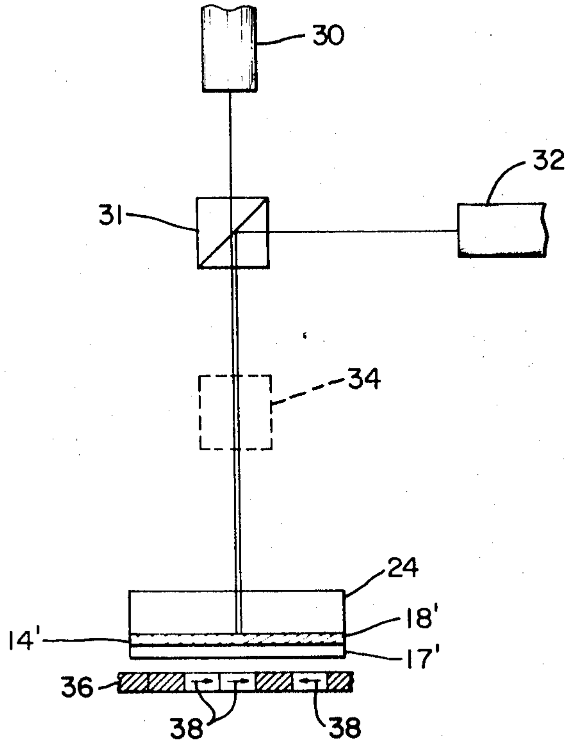
FIG. 2 is a schematic diagram of another preferred form of film transducer in a system adapted for detection of magnetically recorded bits of information on a tape or disk.

The form shown in FIG. 2 is specifically adapted for detection of bits of information recorded on the surface of a magnetic tape which is advanced past the film transducer. Both the prismatic transducer of FIG. 1 and the slide transducer of FIG. 2 can detect bits of information recorded on disk or tape. However, the slide transducer is superior in that it has a wider field of view for the same magnetic bit resolution. This is due to the depth-of-field optical problem of the prismatic transducer. The optical distance from the reflecting surface of the prism to the photodetector 22 varies from point to point on the reflecting surface. Therefore, sharp optical resolution for the prismatic transducer is limited to a rectangular strip at the center and across the width of the reflecting surface of the prism. In the slide transducer, on the other hand, the optical distance from the reflecting surface of the slide to a photodetector is substantially the same from point to point on the reflecting surface. Therefore, for sharp resolution, the slide transducer has a much larger field of view than the prismatic transducer. In FIG. 2, a monochromatic light source 30 transmits light through a beam splitter 31 in a direction perpendicular to the surface of the piezoreflective film 18'. The incident light is also reflected from the surface of the piezoreflective film parallel, but in an opposite direction, to the transmitted light and is reflected by the beam splitter, as illustrated into a photodetector 32 similar to photodetector 22 in FIG. 1.

As an optional feature, a light deflector 34 may be interposed between the beam splitter and film transducer to scan a light progressively across the surface of the piezoreflective film for sequential reading of particular positions on the film surface as the magnetic recorded medium is advanced beneath the film transducer. In that event, preferably a laser beam is employed as the light source.

As shown in FIG. 2, magnetic tape 36 is positioned under the magnetostrictive film 17'. Magnetic fields stored in tape 36 are represented by arrows 38. The shaded areas in tape 36 indicate no magnetic field stored in that area of the tape. The areas of the tape which contain a magnetic field will cause the transducer to reduce the intensity of reflected light passed to the photodetector 32.

In the forms of invention set forth and described herein, most desirably the film layer is made extremely thin, each of the films 17 and 18 being on the order of 100 to 10,000 angstroms in thickness. For the reason that the film layer is extremely thin, it is necessarily supported by another surface, such as, a thin transparent substrate. In order to promote adhesion between the silver piezoreflective film 18 and glass substrate, the surface of the substrate may be coated with an extremely thin film of chromium which is applied only to the extent necessary to insure uniform adhesion between the silver film and the glass. In the alternative, an extremely thin substrate may be utilized with the magnetostrictive film, being self-adhering to the surface and being applied to the side opposite to the recorded surface with the substrate interpositioned between the magnetostrictive film and the recorded medium. Otherwise, if the strength of the magnetic field being sensed is sufficiently great, the film layer may be made of sufficient thickness to possess the requisite sensitivity and nevertheless be self-supporting so as to eliminate the transparent substrate altogether.

It will be seen that the form of invention shown in FIG. 2 avoids the depth-of-field problems associated with the type shown in FIG. 1 and is specifically adapted for detecting magnetic bits recorded on tape. The bit density on the tape may be quite high and the tape read at extremely high speeds. The reflectance of the light rays is reduced at particular positions with localized increases in strain due to resonant absorption of the rays when the piezoreflective film is stressed by the magnetostrictive film at those positions corresponding to the presence of magnetized bits of the tape.

The positions or locations on the piezoreflective film that are strained by the magnetostrictive layer will of course reduce the intensity of light reflected and sensed by the photodetector system; and the intensity of light reflected from each position can be sensed or measured directly by a bank of photodiodes, a vidicon or photomultiplier tube so as to be converted into optical signals.

As previously stated, an alternative method of reading would be to scan a highly concentrated light source across the surface of the film and sequentially measure the intensity from each point. Moreover, in detecting magnetic bits of information most desirably the magnetostrictive film is oriented with its "easy" axis, or axis of least resistance to elongation or contraction, aligned with the polarity of the magnetic field of each bit. Thus, if the bit polarity is aligned lengthwise of the magnetic tape, correspondingly the "easy" axis is aligned in the same direction, and the "hard" axis of the film which is less sensitive to the magnetic field, is aligned transversely of the field.

From the foregoing description of alternate forms of the present invention, the coupled piezoreflective-magnetostrictive film layer is capable of direct sensing of magnetic information and is further capable of rapid response to changing states of magnetization. While the invention has been particularly shown and described with reference to preferred embodiments thereof, it will be understood by those skilled in the art that various changes in form and details may be made therein without departing from the spirit and scope of the invention.

What is claimed is:

1. In a magnetic reproduction system for converting magnetic information contained on a recorded medium to optical signals, a film transducer comprising a magnetostrictive film in close alignment with and contiguous to the recorded medium whereby to undergo localized elongation or contraction at particular positions on the film corresponding to changing patterns of magnetization on the recorded medium, and a piezoreflective film mechanically coupled to said magnetostrictive film whereby to undergo localized changes in reflectivity at points corresponding to changes in elongation or contraction in said magnetostrictive film.

2. In a magnetic reproduction system according to claim 1, said film transducer further including a transparent substrate supporting said magnetostrictive and piezoreflective films in close alignment with the recorded medium.

3. In a magnetic reproduction system according to claim 1, further including a transparent prism overlying the piezoreflective surface of said film transducer.

4. In a magnetic reproduction system according to claim 1, said magnetostrictive film being composed in percentage by weight of 60 percent nickel, 25 percent iron, and 15 percent cobalt, and said piezoreflective film being composed of silver.

5. In a magnetic reproduction system according to claim 4, the thickness of said magnetostrictive and piezoreflective films each being on the order of 100 to 10,000 angstroms, said piezoreflective film being coated by evaporation to said magnetostrictive film.

6. A magnetic reproduction system for converting magnetic information contained on a recorded medium to optical signals comprising a film transducer composed of a magnetostrictive film contiguous to and in close alignment with the recorded medium to undergo localized changed in elongation or contraction in response to and corresponding to changing patterns of magnetization on the recorded medium and a piezoreflective layer mechanically coupled to the magnetostrictive film layer to undergo localized changes in reflectivity corresponding to localized changes in elongation or contraction in said magnetostrictive film, a transparent substrate supporting said film transducer in close alignment to the recorded medium with the piezoreflective film overlying said magnetostrictive film, light transmitting means for transmitting light incident to said piezoreflective film, and photodetector means for intercepting reflected light from said piezoreflective film and for producing signals according to the intensity of light from said piezoreflective film surface whereby to indicate the presence or absence of magnetic information on the recorded medium.

7. A magnetic reproduction system according to claim 6, said magnetostrictive film selected from the group consisting of permalloys and nickel/iron alloys, and said piezoreflective layer being selected from the group consisting of silver, gold, and copper.

8. A magnetic reproduction system according to claim 6, said light transmitting means transmitting light perpendicular to said piezoreflective film.

9. A magnetic reproduction system according to claim 8, said light transmitting means including a light source and a beam splitter interposed between said light source and said piezoreflective film.

10. A magnetic reproduction system for converting magnetic bits of information contained on a magnetic tape medium to optical signals comprising a film transducer composed of a mechanically coupled piezoreflective-magnetostrictive film layer in close alignment with the magnetic tape, said magnetostrictive film undergoing changes in elongation or contraction in response to changing patterns of magnetization on the magnetic tape to impart changes in strain in said piezoreflective film at locations corresponding to the magnetized areas on the magnetic tape, a transparent substrate supporting said magnetostrictive film in contiguous relation to the recorded medium with said piezoreflective film overlying said magnetostrictive film, light transmitting means for transmitting light perpendicular to said piezoreflective film, a beam splitter intercepting the light reflected from said piezoreflective film, and photodetector means intercepting reflected light from said beam splitter and for producing optical signals according to the intensity of light from selected locations on said piezoreflective film surface whereby to indicate the presence or absence of magnetic information on the magnetic tape.